United States Patent [19]

Retter et al.

[11] Patent Number: 5,557,538
[45] Date of Patent: Sep. 17, 1996

[54] MPEG DECODER

[75] Inventors: Refael Retter, Haifa; Moshe Bublil, Netanya; Gad Shavit, Givat Ella; Aharon Gill, Haifa; Ricardo Jaliff, Nesher; Ram Ofir, Zichron Yaacov; Alon Boner, Hofit; Oded Ilan, Haifa; Eliezer Hassut, Kiryat Bialik, all of Israel

[73] Assignee: Zoran Microelectronics Ltd., Haifa, Israel

[21] Appl. No.: 245,469

[22] Filed: May 18, 1994

[51] Int. Cl.$^6$ .......................... H04N 11/02; H04N 7/12; H04N 11/04
[52] U.S. Cl. ...................... 364/514 A; 348/402; 348/407; 395/114; 395/154
[58] Field of Search .......................... 364/514 A; 382/56; 395/114, 118, 154; 348/402, 403, 407

[56] References Cited

U.S. PATENT DOCUMENTS

| | | | |
|---|---|---|---|
| 4,293,920 | 10/1981 | Merola . | |
| 5,206,859 | 4/1993 | Anzai | 370/110.1 |
| 5,257,113 | 10/1993 | Chen et al. . | |
| 5,301,191 | 4/1994 | Otani | 370/84 |
| 5,319,447 | 6/1994 | Garino et al. | 368/708 |
| 5,325,423 | 6/1994 | Lewis | 379/90 |
| 5,371,547 | 12/1994 | Siracusa et al. . | |
| 5,377,266 | 12/1994 | Katta et al. | 380/20 |
| 5,379,070 | 1/1995 | Retter et al. | 348/403 |
| 5,379,356 | 1/1995 | Purcell et al. | 382/56 |
| 5,392,223 | 2/1995 | Caci | 364/514 |
| 5,394,189 | 2/1995 | Motomura et al. | 348/402 |
| 5,396,497 | 3/1995 | Veltman | 370/100.1 |
| 5,410,556 | 4/1995 | Yeh et al. . | |
| 5,414,469 | 5/1995 | Gonzales et al. | 348/408 |
| 5,422,674 | 6/1995 | Hooper et al. . | |
| 5,428,403 | 6/1995 | Andrew et al. | 348/699 |
| 5,432,900 | 7/1995 | Rhodes et al. | 395/157 |

OTHER PUBLICATIONS

Normile et al., "Image Compressions Using Course Grain Parallel Processing", IEEE, 1991, CH2977–7/91/ 0000–1121, 1121–1124.

Chang et al., "An Experimental Digital HDTV Video Decoder System", Int'l Broadcasting Conv., 16–20 Sep. 1994, 70–75.

Tsai et al., "An MPEG Audio Decoder Chip", IEEE, 0098 3065/95, 89–96.

Akiyama et al., "MPEG2 Video Codec Using Image Compression DSP" IEEE, 0098 3063/94, 466–472.

Razavi et al., "VLSI Implementation of an Image Compression Algorithm with a New Bit Rate Control Capability", IEEE, 0–7803–0532–9/92, 660–672.

Grunin, Image Compression For PC Graphics, PC Magazine, vol. 11, No. 8, Apr. 28, 1992, pp. 337–350.

Leonard, Silicon Solution Merges Video, Stills, And Voice, Electronic Design, Apr. 2, 1992, pp. 45–54.

Product Highlights, Video Compression Processor Handles Multiple Protocols, Electronic Products, Oct. 1991, pp. 85–86.

Wilson, One–Chip Video Engine, Electronic Engineering Times, Issue 659, Sep. 16, 1991, pp. 1, 8–9.

Preliminary Application Note, Using The IIT Vision Processor In JPEG Applications, Integrated Information Technology, Inc., Sep. 1991, pp. 1–15.

Preliminary Data Sheet, IIT Vision Processor—Single–Chip Microcode–Driven VSP For DCT–Based Algorithms, Integrated Information Technology, Inc., Sep. 1991, pp. 1–20.

Application Note, Video Compression Chip Set, LSI Logic Corporation, Sep. 27, 1990, pp. 1–16.

Tentative Data, ST13220 Motion Estimation Processor, SGS–Thomson Microelectronics, Jul. 1990, pp. 1–24.

Fandrianto et al., "A Programmable Solution for Standard Video Compression", 1992.

Primary Examiner—Emanuel T. Voeltz
Assistant Examiner—Patrick J. Assouad
Attorney, Agent, or Firm—Townsend and Townsend and Crew LLP

[57] ABSTRACT

An MPEG decoder which distributes the processing load to a plurality of processors and units including an external memory and a bus interface unit, a de-multiplexing data

MPEG DECODER BLOCK DIAGRAM processor, an image data processor, an inverse transform and reconstruction processor, and a prediction calculation unit. A video post-processing unit generates video data, and a serial port unit provides an output for audio data.

3 Claims, 2 Drawing Sheets

MPEG DECODER

BACKGROUND OF THE INVENTION

This invention relates generally to the encoding and decoding of multimedia data, and more particularly the invention relates to a decoder of audio and video data which has been encoded in accordance with the MPEG (Motion Picture Experts Group) standard for full-motion video.

A real time processing system for MPEG decoding needs to perform a given number of "simple" operations per second and has some processing clock whose max frequency is determined by the current state of the art of the semiconductor implementation technology. In addition, the processing system needs some memory for buffering and storage of input data, intermediate results, output data, and sometimes also instruction data.

The semiconductor implementation technology imposes a practical limit on the cost effective size of a semiconductor device. The amount of processing and the amount of memory needed determine if one device can be used or multiple devices are needed. If multiple devices are needed, then there is an option to divide the processing and the memory to the various devices or to dedicate one (or more) of the devices for memory only, and dedicate the rest of the devices mainly for processing with some memory on board.

The advantage to utilize memory only devices is in the opportunity to use general purpose memory-devices which are made in huge quantities and hence have low price. The disadvantage is in the amount of data transfer needed between the processing devices and the memory devices. In some cases the amount of total needed memory divided by the number of needed processing devices is such that the amount of memory needed in each of the processing devices still exceeds the limits of a cost effective solution. In these cases, one (or more) devices dedicated to memory are needed. If the number of "simple" operations per second required is less than, or approximately equal to the max processing clock frequency, then one device can be used which contains one processing unit. If the number of "simple" operations per second required exceeds the max processing clock frequency, then one device with a number of processing units (not necessarily of the same function) can be used. If the number of processing units required is more than could be cost-effectively implemented within one device, then a number of devices are needed.

If the number of data units for MPEG decoding, such as the Huffman coded "events" and reconstructed picture color components "samples" processed by one of the processing units, is much smaller than the max processing clock frequency, and if the "simple" operations are different from each other (e.g., a mix of arithmetic and logic operations with loops and repeated sequences), a processing unit structure similar to a general purpose processor, which is programmed by an instruction set from a program memory, should be considered. Such a processing unit is denoted herein by the name "processor".

The processing tasks of the decoder device for MPEG system and video decoding and for audio synchronization are the following:

a) Receive the system (or video only) bitstream. The data can enter the decoder at a constant bitrate or by demand.

b) Demultiplex the system bitstream, extract the specified video and serial data streams (e.g., audio) and write them in the coded data buffers.

c) Read the video stream from the video code buffer and decode it. The video decoding can be broken down to the following tasks:
1) Decoding of the various headers.
2) Decoding of each sample block (Huffman decoding) to retrieve the quantized coefficients data.
3) Descale and dequantize the coefficients.
4) Inverse DCT transform the dequantized coefficients.
5) Read one or two picture reference data blocks (as needed).
6) Calculate the prediction block and add it to the result of the inverse DCT transform of the dequantized coefficients.
7) Write the results in the decoded picture data buffer.

d) Read the decoded picture data from the decoded picture data buffer, post-process it (as needed, e.g., conversion from progressive to interlaced format or color conversion from Y, U and V to the color space needed for display) and output it timed to the video synchronization signals or video demand signals.

e) Read the serial coded data from the serial data code buffer, reformat it as necessary (e.g., parallel to serial conversion) and output it timed to achieve the synchronization specified in the system bitstream at a constant rate specified in the serial data stream.

All the five processing tasks described above are not naturally synchronized within a picture decoding period, but only every picture decoding period. The MPEG decoding algorithm described above specifies several buffers for proper decoding. The first type of buffers are coded bitstream buffers. If the decoder decodes video only, then one coded bitstream buffer is needed. If the decoder decodes the multiplexed system bitstreams, then the number of coded bitstream buffers needed is equal to the number of bitstreams synchronized by the decoder. The second type of buffers are decoded pictures buffers used as reference data in the decoding process. Two picture buffers are needed for this purpose. When the coded pictures are progressive (as is the case in MPEG 1 and some subsets of MPEG 2) and the decoder has to support conversion of the decoded picture to interlaced display, at least a third picture buffer is needed.

Even for constrained MPEG 1 video bitstreams, the size of the needed coded video bitstream buffer (typically about 40 Kbytes) and SIF size picture buffers (typically about 125 Kbytes per picture) precludes a cost effective solution that supports the needed buffers inside the decoder device, so that an external buffer, composed of one or more memory devices, completely controlled by the decoder, is a better solution.

Of the common types of RAM devices (SRAM, VRAM and DRAM), the DRAM offers the most cost effective solution and indeed many of the decoders already implemented use external DRAM buffers. The requirements of the DRAM structure and mapping of the various buffers to the DRAM address space are described in copending application Ser. No. 08/245,465 filed May 18, 1995 for Dynamic Random Access Memory for MPEG Decoding.

MPEG and other processing requirements: A decoded picture is composed of three rectangular components: One (the Y component) is l lines by p samples by 8 bits, and the other two (the U and V components) are ½ lines by p/2 samples by 8 bits.

The pictures are written in 8*8 sample blocks as they are decoded. The order of decoding are by macroblocks which contain four Y blocks followed by one U block and then one V block.

For some macroblocks, decoding requires reference data from one reference picture. For some macroblocks, decoding requires reference data from two reference pictures. The data needed for the decoding of each block of those macroblocks if one 9*9 sample block with origin at any sample of the component, from either one or both of the reference pictures.

For display, each of the three picture buffers (or only two, as the case may be), is read in raster scan order. The data of all three components are usually needed in parallel.

For MPEG 1 SIF size pictures, the sample rate (Y, U and V samples combined) is about 3.8 Msamples/Sec. The number of operations needed for most of the processing tasks, apart system code data, serial data handling and Huffman decoding, have a practically linear relationship with the size of the decoded picture.

The number of simple operations per second needed for MPEG 1 or main profile of MPEG 2 decoding is such that a single device with multiple processing units can be used. The choice of the number of the processing units within the device, their structure and function and their connectivity is the subject of this invention.

SUMMARY OF THE INVENTION

In accordance with the invention, a decoder architecture is provided for MPEG image data decoding.

The architecture includes a plurality of processors and units including an external memory and a bus interface unit, a de-multiplexing data processor, and image data processor, an inverse transform and reconstruction processor, and a prediction calculation unit. A video post-processing unit generates video data, and a serial port unit provides an output for audio data.

In accordance with the architecture, the distribution of the processing "load" to each of the processing units is similar, so that the design and testing of each unit can be done in parallel. Further, using multiple units of the same structure is very cost effective. If units have very similar structure attempts should be made to make them identical, even if each of them will become somewhat less efficient. It is much easier to obey this guideline with programmable processor units, since the differences can be designed into the program and not into the hardware structure. However, if the units structure are less than very similar, then each of the units should be designed by itself and optimized for the processing tasks allocated to it.

Processing tasks allocated to a specific unit should require the same processing structure, and the distribution of the processing tasks to each of the processing units should be such that the amount of data transferred between the units is minimized. For N processing units there could be a maximum of N*(N−1) unidirectional connections. The distribution of the processing tasks to each of the processing units should be such that the number of connections between the units is minimized. One way to achieve it is to use a bus structure to connect one unit to all other units which receive data from this unit. When contention between data in both directions is non-existent, bidirectional connections or buses should be considered.

In many cases, data needed by one unit is generated by another unit not exactly when needed. In these cases suitable buffers are needed in one of these units. The distribution of the processing tasks to each of the processing units, and the timing of these tasks, should be such that the number and size of the buffers are minimized. The number of different clocks driving the different units should be minimized. Each unit should have only one driving clock.

The invention and objects and features thereof will be more fully understood from the following description and appended claims when taken with the drawings.

DETAILED DESCRIPTION OF ILLUSTRATIVE EMBODIMENT

Figure 1:
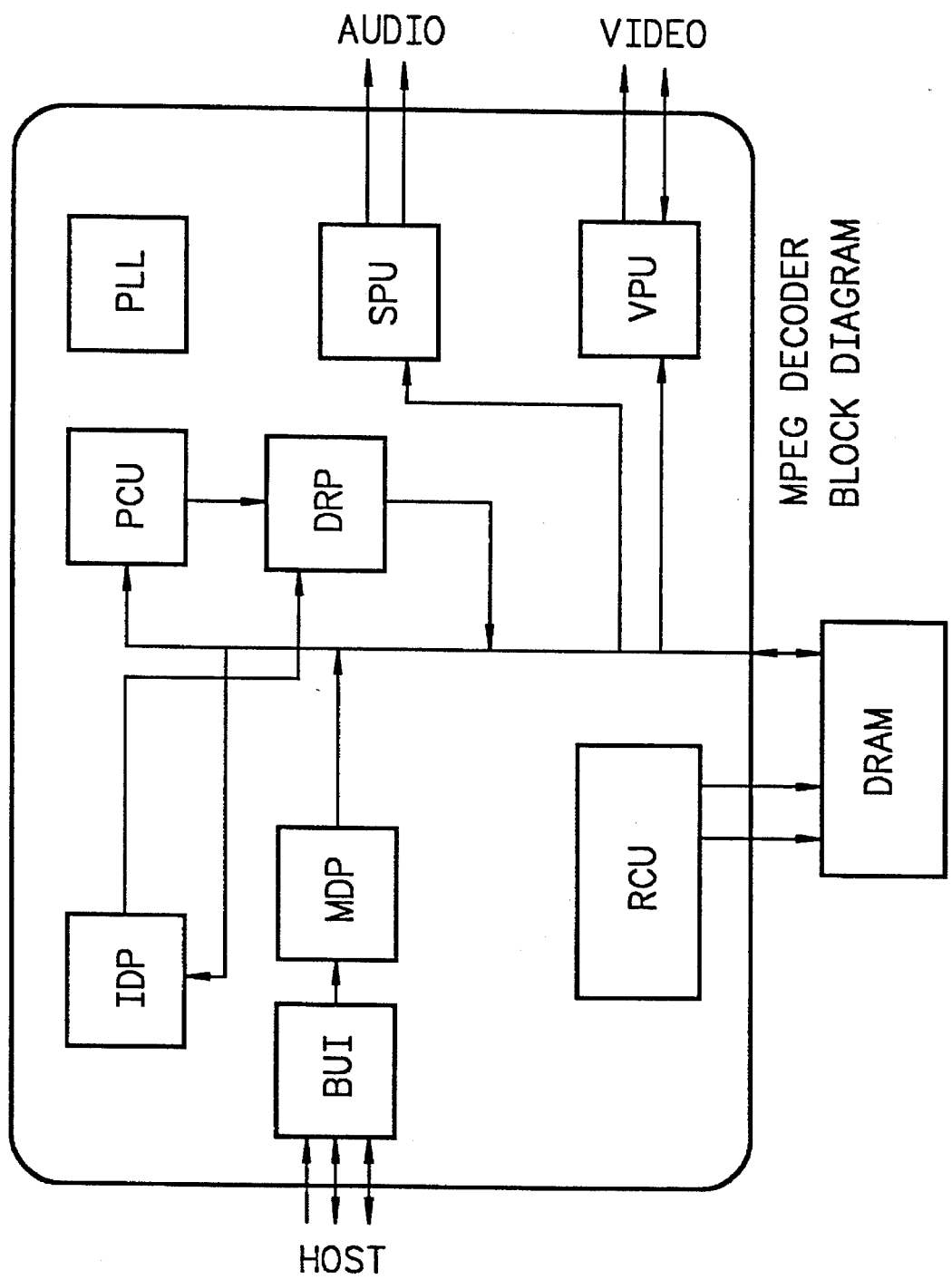
FIG. 1 is a block diagram of an MPEG decoder in accordance with the invention.
Figure 2:
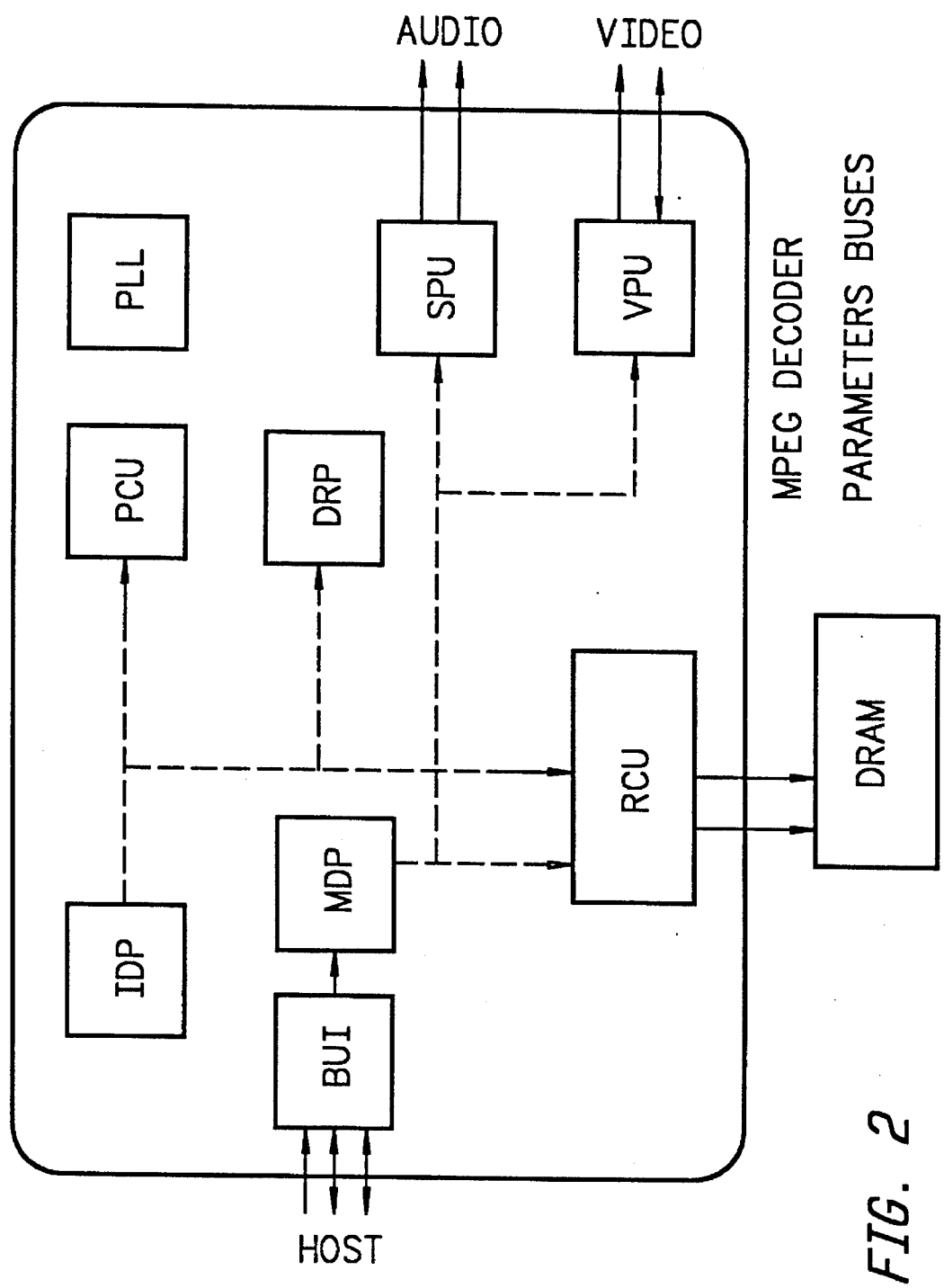
FIG. 2 is the block diagram of FIG. 1 and illustrating parameter buses.

FIGS. 1 and 2 are block diagrams of the MPEG decoder of Zoran Corporation, assignee, designated the ZR36100, in accordance with the invention. This embodiment of the invention is an MPEG I system and video decoder that has to handle one video stream with picture size up to 352*288 and at least 46 Kbytes of code buffer, and two serial streams (audio or private) with at least 4 Kbytes buffer each. The device has to support interlaced output also.

The external buffer chosen for this example is 256*16 bits DRAM (see copending application Ser. No. 08/245,465, supra) with transfers sequenced in a repetitive pattern (as described in copending application Ser. No. 08/245,740 filed May 18, 1994 for MPEG Decoder Memory Data Storage and Transfer.

The processing functions are divided among 8 processing units and a clock unit. Of the 8 processing units, 3 are programmable (by instruction) processors and 5 are non-programmable (by instruction) processing units. All units are controlled to some extent by user defined set-up parameters. These 8 processing units and their connectivity are described below (See FIGS. 1 and 2).

The MDP (de-Multiplexing Data Processor) performs the de-multiplexing of the video and audio coded data from the input system bitstream and writes the different kinds of coded data embedded to the different code buffers in the external DRAM. The MDP is also responsible for all set-up parameters processing and audio and video delay calculations for synchronization. It includes an instruction program buffer which is loadable from the outside. The MDP manages an internal unidirectional bus on which it sends the parameters, synchronization data and commands to some of the other units.

The IDP (Image Data Processor) is responsible for the first stage of the video decoding: Processing of all the coded video headers, calculation of the motion vectors, and decoding of each sample block (Huffman decoding) to retrieve the quantized coefficients data. The IDP includes an instruction program buffer which is loadable from the outside. The IDP manages an internal unidirectional bus on which it sends decoded coefficients, quantization tables and parameters to the DRP (see next item) using a Zig-Zag address translator and parameters to some of the other units.

The DRP (iDCT and Reconstruction Processor) is responsible for the execution of the de-scaling, de-quantization, inverse discrete cosine transform of a decoded component coefficient block, and addition of the prediction block calculated by the PCU (see next item). The program executed by the DRP is stored in ROM in the decoder so that it is not loadable from the outside.

The PCU (Prediction Calculation Unit) is responsible for the calculations of the prediction blocks from the two reference pictures data. There are three major functions performed by the PCU: Reduction of the reference picture data read from the DRAM from 10×9 to 9×9 samples; horizontal and vertical interpolation of each of the 9×9 blocks to generate two 8×8 blocks; and generation of a single prediction block by interpolating these last two blocks. The processing part of the PCU is very similar to a programmable processor but it is controlled by a state machine instead of a program memory.

The VPU (Video Post-processing Unit) generates the YUV or RGB display data in all different formats according to the user's choices. The VPU supports all the video synchronization modes such as input or output, progressive or interlaced timings and blanking. The VPU manages also an enable mode mechanism by which the video is output by demand instead of being timed by the video synchronization signals.

The BIU (Bus Interface Unit) is responsible for the communication between the host and the decoder according to parameters sent to the decoder by the external host. The BIU supports 16 or 8 bits width and I/O or DMA mode transfers.

The SPU (serial Port Units) is responsible for the serial outputs of the audio or private data embedded in the system bitstream. It consists of two serial output ports. Each port consists of an output serial data signal, an output Frame synchronization signal and an-input/output Clock signal. One of the two ports has an extra output which transfers serial commands to the audio decoder to indicate transitions between special operating modes.

The RCU (external DRAM Control Unit) manages the external DRAM device by generating all the control signals and the address needed. The RCU is also responsible for generating the refresh cycles to the DRAM. It includes the main sequencer of the chip which drives itself (and the DRAM transfers, see copending application Ser. No. 08/245,740, supra), and the IDP, DRP and PCU. The BIU and MDP operate asynchronously, driven by the availability of coded data from the host. The VPU and SPU are each driven by its own synchronization signals. The RCU handles most of the special operating modes of the device such as Freeze, Slow motion, Single step, Fast search and random access. The RCU manages an internal bidirectional bus on which all data transfers between the external DRAM buffer and all the internal units. The data part of the bus is connected directly to the DRAM.

The clock unit accepts input clock signals or a crystal in the frequency range of 12 to 14.75 MHz (which is the pixel frequency range for common video formats) and multiples it by 4× or 4.5× using an internal PLL circuit to generate an internal processing clock in the range of 54 MHz to 59 MHz.

There has been described one embodiment of an MPEG decoder in accordance with the invention. While the invention has been described with reference to this embodiment, the description is illustrative of the invention and is not to be construed as limiting the invention. Various modifications and applications may occur to those skilled in the art without departing from the true spirit and scope of the invention as defined by the appended claims.

What is claimed is:

1. A decoder for multimedia encoded data of multiframe motion pictures comprising an external memory for storing and transferring data in a repetitive pattern, a bus interface unit for interfacing with a host system, a de-multiplexing data processor interconnected with said bus/interface unit for demultiplexing video and audio coded data from said host system and processing said data for transfer to other units of the decoder, an image data processor interconnected with said de-multiplexing data processor for video signal decoding, an inverse transform and reconstruction processor interconnected with said image data processor for executing de-scaling, de-quantization, and inverse transformation of decoded video signals, a prediction calculation unit interconnected with said external memory for calculating prediction blocks from two reference pictures data stored in said external memory and generating a prediction block by interpolation of reference picture data blocks, a video post-processing unit interconnected with said inverse transform and reconstruction processor and said external memory for generating video display data, and a serial port unit interconnected with said processors and said external memory for serial output of audio data.

2. The decoder as defined by claim 1 and further including a memory control unit interconnected with said demultiplexing data processor and said image data processor for managing said external memory by generating control signals and addresses and for generating refresh cycles.

3. The decoder as defined by claim 1 and further including a clock unit for generating an internal processing clock for all elements of said decoder.

* * * * *